US008995055B1

(12) United States Patent
Feng

(10) Patent No.: US 8,995,055 B1
(45) Date of Patent: Mar. 31, 2015

(54) ANGULAR AND SPECTRAL SELECTIVE ABSORBER IN ULTRATHIN METAMATERIALS

(75) Inventor: Simin Feng, Ridgecrest, CA (US)

(73) Assignee: The United States of America as Represented by the Secretary of the Navy, Washington, DC (US)

(*) Notice: Subject to any disclaimer, the term of this patent is extended or adjusted under 35 U.S.C. 154(b) by 469 days.

(21) Appl. No.: 13/585,111

(22) Filed: Aug. 14, 2012

Related U.S. Application Data

(60) Provisional application No. 61/562,128, filed on Nov. 21, 2011.

(51) Int. Cl.
G02B 5/20 (2006.01)
G02B 5/00 (2006.01)
G02B 5/22 (2006.01)
G02B 1/00 (2006.01)

(52) U.S. Cl.
CPC ............... *G02B 5/208* (2013.01); *G02B 5/003* (2013.01); *G02B 5/22* (2013.01); *G02B 1/002* (2013.01)
USPC .......................................... 359/360; 359/885

(58) Field of Classification Search
None
See application file for complete search history.

(56) References Cited

U.S. PATENT DOCUMENTS 8,927,933 B1 * 1/2015 Feng .......................... 250/338.1

OTHER PUBLICATIONS

G. Subramania, A. J. Fischer, T. S. Luk, 'Optical properties of metal-dielectric based epsilon near zero metamaterials', Appl. Phys. Letts., vol. 101, 241107, Dec. 11, 2012.*
J. Karri, A. R. Mickelson, 'Silver dielectric stack with near-zero epsilon at a visible wavelength', 2009 IEEE Nanotechnology Materials and Devices Conference, Jun. 2-5, 2009, Traverse City, Michigan, USA, pp. 148-153.*
S. Feng, K. Halterman, 'Coherent perfect absorption in epsilon-near-zero metamaterials', Phys. Rev. B, vol. 86, 165103, Oct. 2, 2012.*
S. Feng, K. Halterman, 'Perfect absorption in ultrathin epsilon-near-zero metamaterials induced by fast-wave non-radiative modes', arVix:1112.0580[physics.optics], Dec. 6, 2011.*

* cited by examiner

*Primary Examiner* — Arnel C Lavarias
(74) *Attorney, Agent, or Firm* — James M. Saunders

(57) ABSTRACT

An angular and spectral selective absorber in ultrathin metamaterials is an absorber having an absorption wavelength, $\lambda$. Embodiments of the invention include at least one primary layer having a thickness, d, and a relative permittivity of epsilon-near-zero, $\epsilon$. At least one reflective secondary layer is associated with the primary layer. The association is by bonding.

15 Claims, 5 Drawing Sheets

ANGULAR AND SPECTRAL SELECTIVE ABSORBER IN ULTRATHIN METAMATERIALS

CROSS-REFERENCE TO RELATED APPLICATIONS

This is a non-provisional application, claiming the benefit of parent provisional application number 61/562,128 filed on Nov. 21, 2011, whereby the entire disclosure of which is incorporated hereby reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to absorbers, and more particularly, to a new way to fabricate a structure having a low loss ultra-thin epsilon-near-zero (ENZ) metamaterial placed on the top of a metal.

Figure 1:
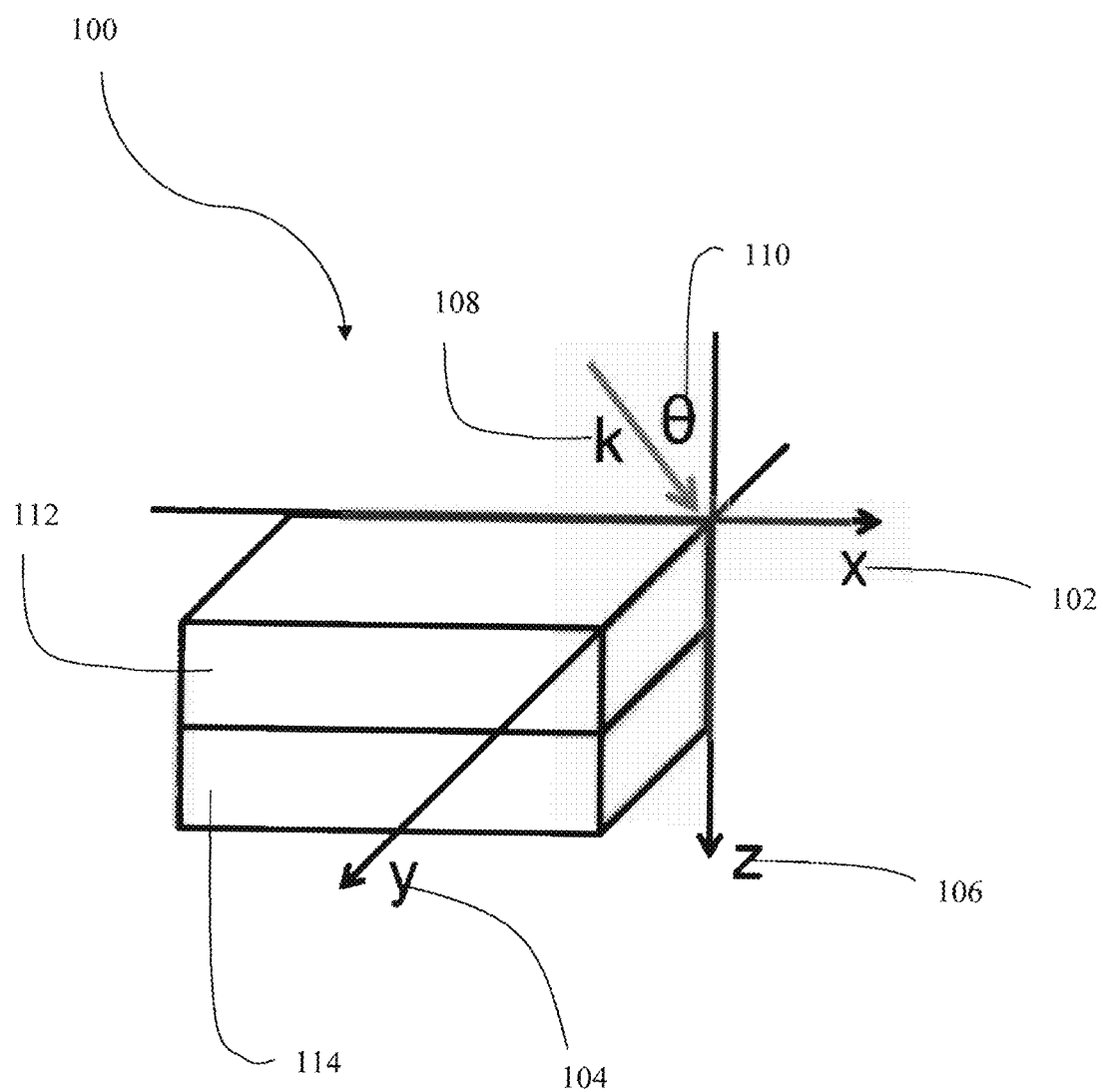
FIG. 1 is a perspective view of an angular and spectral selective absorber in ultrathin metamaterials, according to embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

The invention generally relates to absorbers, and more particularly, to a new way to fabricate a structure having a low loss ultra-thin epsilon-near-zero metamaterial placed on the top of a metal. Epsilon-near-zero is commonly abbreviated as both ENZ and ϵ.

Embodiments of the invention provide a new methodology for angular and spectral selective infrared absorption using epsilon-near-zero metamaterials. Common absorbers are thick and are limited by operating wavelength (λ). Currently, the best geometric quality factor (the ratio of the perfect absorption wavelength to the thickness of the absorber) is about 40. Absorbers are in high demand. Absorbers employing embodiments of the invention can be beneficial for cloaking, electromagnetic shielding, photocells, and sensor applications.

An angular and spectral selective infrared perfect absorber is modeled. This structure has a low loss ultra-thin epsilon-near-zero metamaterial placed on the top of a metal or a metal alloy. In this structure, wide-angle perfect absorption can be obtained by exciting the fast-wave modes. The ratio of the perfect absorption wavelength to the thickness of the epsilon-near-zero metamaterial can be as high as 10000. In other words, the EM energy can be confined in a layer as thin as λ/10000. The perfect absorption wavelength happens at the epsilon-near-zero wavelength of the metamaterial.

Above-light-line surface plasmon polariton exists at the interface between the metal and the epsilon-near-zero metamaterial. This unique feature supports unusual fast-wave modes in the epsilon-near-zero metamaterial. Wide-angle perfect absorption can be obtained by exciting this peculiar mode. These fast-wave modes naturally match with the space-wave field, and thus are easily accessible from free space. The perfect absorption wavelength can be tuned from mid- to far-infrared by tuning the wavelength of the epsilon-near-zero while keeping the thickness of the structure unchanged. Therefore, an extraordinarily high ratio of the perfect absorption wavelength to the thickness of the absorber can be accomplished. The perfect absorption angle can be selected by varying the thickness of the epsilon-near-zero metamaterial and accurately tuning the precise value of the complex epsilon near-zero permittivity of the metamaterial.

Although embodiments of the invention are described in considerable detail, including references to certain versions thereof, other versions are possible. Examples of other versions include orienting the layers in different fashion. Therefore, the spirit and scope of the appended claims should not be limited to the description of versions included herein.

In the accompanying drawings, like reference numbers indicate like elements. FIG. 1 illustrates a perspective view of an angular and spectral selective absorber in ultrathin metamaterials, according to embodiments of the invention. Reference character 100 depicts an apparatus of embodiments of the invention. The apparatus 100, an angular and spectral selective absorber in ultrathin metamaterials, is an absorber that may also be referred to with other descriptions including, but not limited to, an absorber, a bi-layer absorber, a layered absorber, and an ENZ-PEC bilayer, without detracting from the merits or generality of embodiments of the invention.

The apparatus 100 is viewed relative to the x-axis 102, y-axis 104, and z-axis 106. A absorption wave vector, k, 108 is shown. An absorption angle, θ, 110 is the angle between the z-axis 106 and the absorption wave vector 108. The absorption angle, θ, 110 is also referred to as the angle of influence and, thus, the two terms are interchangeable.

Embodiments of the invention generally relate to an absorber having an absorption wavelength, λ, including: at least one primary layer 112 having a thickness, d, and a relative permittivity of epsilon-near-zero, ϵ. This relates to the optics, infrared, microwave, and radio wavelengths. At least one reflective secondary layer 114 is associated with at least one primary layer 112.

A natural dielectric material may be used as the primary layer 112. An engineered material may also be used as the primary layer 112. Appropriate examples of suitable engineered materials include composites and metamaterials.

Another embodiment of the invention generally relates to a bi-layer absorber having an absorption wavelength, $\lambda$, including: at least one natural dielectric layer 112 having a thickness, d, and a relative permittivity of epsilon-near-zero, $\epsilon$. This relates to the optical, infrared, microwave, and radio wavelengths. At least one reflective layer 114 is bonded to the natural dielectric layer 112. The natural dielectric layer 112 is silicon carbide. The reflective layer 114 is copper.

In yet another embodiment, the invention generally relates to a bi-layer absorber having an absorption wavelength, $\lambda$, including: at least one engineered material layer 112 having a thickness, d, and a relative permittivity of epsilon-near- zero, $\epsilon$. This relates to the optics, infrared, microwave, and radio wavelengths. At least one reflective layer 114 is bonded to the engineered-material layer 112. The engineered-material layer 112 is a composite.

The thickness of the primary layer 112, d, is less than one-tenth of the absorber absorption wavelength, $\lambda$. The ratio of d/$\lambda$ is less than or equal to 0.1. When the real component of relative permittivity in the z-direction of the primary layer, z,900 ($\epsilon_z$), approaches zero, z,900 ($\epsilon_z$)$\to$0, coupled with the real component of relative permittivity in the z-direction of the primary layer, z,900 ($\epsilon_z$), being much less than the imaginary component of relative permittivity in the z-direction ($\Im(\epsilon_z)$, z,900 ($\epsilon_z$) $<<\Im(\epsilon_z)$), a linear relationship exists. In this context, much less than is defined as smaller than one-tenth, thus z,900 ($\epsilon_z$) is less than one tenth $\Im(\epsilon_z)$, which may also be expressed as z,900 ($\epsilon_z$)$<0.1(\Im(\epsilon_z))$. The ratio of the primary layer thickness to the absorber wavelength and dissipation (d/$\lambda$ and $\Im(\epsilon_z)$) are linearly related by $$\frac{d}{\lambda} \approx \frac{\Im(\varepsilon_z)}{2\pi \sin\theta_p \tan\theta_p}.$$

The absorption angle of the absorber is $\theta_p$.

In embodiments, the apparatus 100 is modeled as being surrounded by air, also sometimes referred to as free space. Other surrounding materials such as, for example, water or oil, may also be used depending on application specific-conditions. The reflective layer 114 is selected from the group consisting of natural reflective materials and engineered reflective materials.

Examples of natural reflective materials include metals in the long wavelength region such as, for example, infrared, microwave, and radio frequency waves. Examples of engineered reflective materials include photonic bandgap materials and metamaterials. Other materials may be used without detracting from the merits or generality of embodiments of the invention. The association between the primary layer 112 and the reflective secondary layer 114 is by bonding. Examples of bonding include, but are not limited to, mechanical bonding, chemical bonding, van der Waals bonding, dipole interaction, and ionic bonding.

In some embodiments, the primary layer 112 is a natural dielectric material.

Examples of natural dielectric materials include, but are not limited to, glass, silicon-carbide (Si—C), diamond, silicon, and silica. In other embodiments, the primary layer 112 is an engineered material. In embodiments, the secondary layer 114 is at least one reflective substrate.

In embodiments, the primary layer 112 may be referred to as the natural dielectric layer, or engineered material layer, or ENZ layer. Likewise, the reflective secondary layer 114 may be referred to as the reflective layer, metal layer, or perfect electric conductor layer (PEC). Additionally, although depicted as a single layer in FIG. 1, the primary layer 112 and the reflective secondary layer 114 may include additional layers. Furthermore, numerous descriptions of the layers are also possible without detracting from the merits or generality of embodiments of the invention, given that the overall effective permittivity of layers composing the primary layer 112 satisfies the conditions: $\epsilon_z \to 0$ and z,900 ($\epsilon_z$)$<<\Im(\epsilon_z)$. This means that when the primary layer 112 is composed of more than one layer, the permittivity is the overall effective permittivity of the primary layer.

Likewise, when the reflective secondary layer 114 is composed of more than one layer, either the reflective secondary layer is located adjacent to (bonded to) the primary layer 112, or the overall structure of the secondary layer is reflective.

Numerous orientations of the apparatus 100 and respective layers 112 and 114 are possible dependent on the direction of the absorption wave vector, k, 108. Layer thicknesses are based on application-specific conditions and are affected by material EM wavelengths.

In conventional materials, strong absorption usually requires that the material have either high loss or a large thickness to wavelength ratio, (d/$\lambda$>>1). Significant modeling and experimentation was performed with embodiments of the invention. Based on these results, the situation is vastly different for bilayer structures composed of a metallic substrate and an anisotropic epsilon-near-zero (ENZ) metamaterial, where the permittivity in the direction perpendicular to its surface, $\epsilon_z$, vanishes. Remarkably, perfect absorption can occur in situations where the metamaterial is arbitrarily thin (d/$\lambda$<<1) and having an arbitrarily low loss. Low loss is defined such that $\Im(\epsilon_z)$<1. Numerical and analytical solutions reveal that, under the conditions $\epsilon_z \to 0$ and $\Im(\epsilon_z)$>>z,900 ($\epsilon_z$), at perfect absorption there is a linear relationship between the thickness and the loss, which means the thickness of the absorber can be pushed to zero by reducing the material loss to zero. This counterintuitive behavior is explained in terms of coherent perfect absorption (or stimulated absorption) via critical coupling to a fast wave propagating along the ENZ layer.

Figure 2:
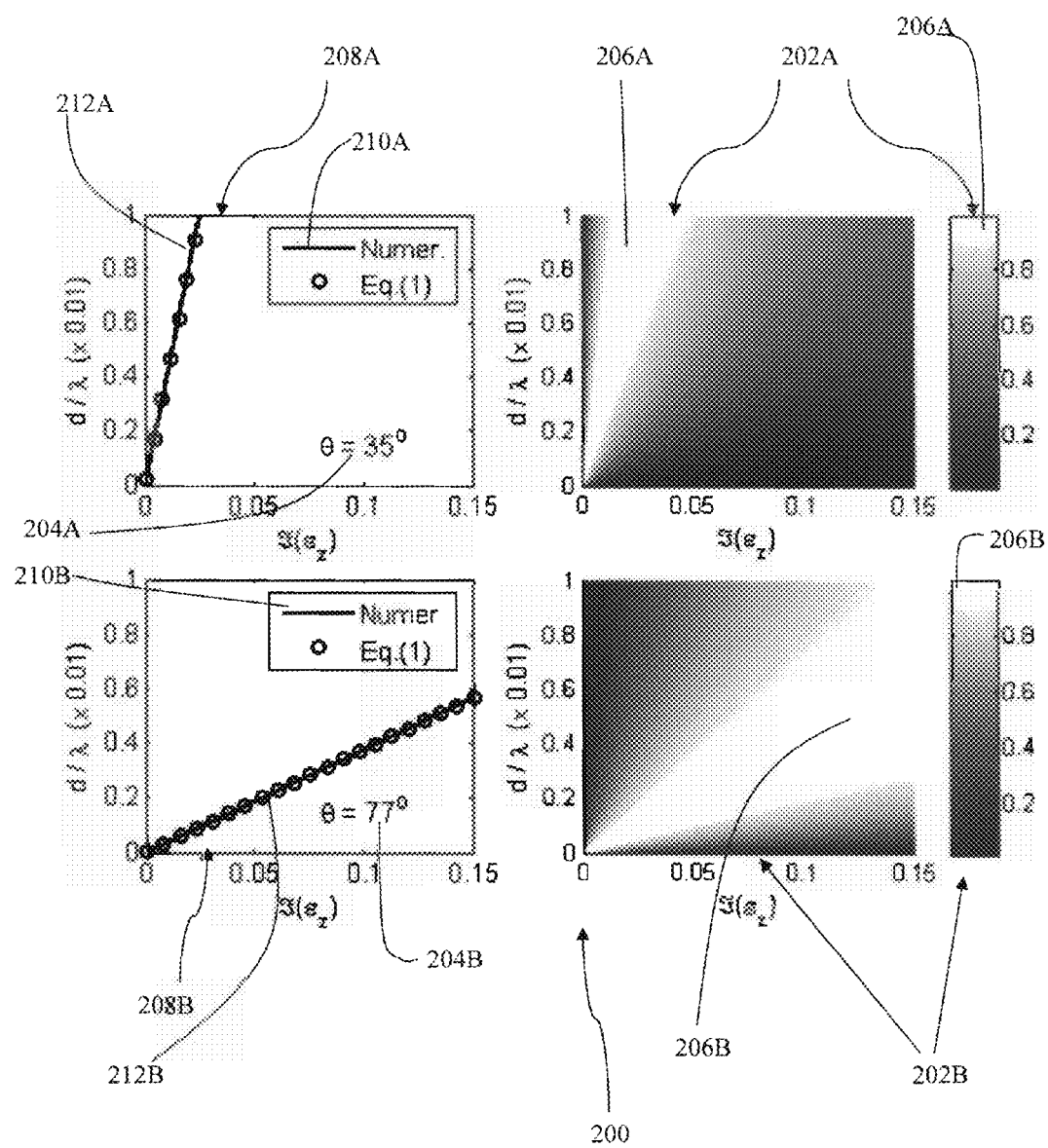
FIG. 2 is a graphical comparison of absorptance as a function of dissipation, $\Im(\epsilon_z)$, and the ratio of the primary layer thickness to the absorber wavelength (d/λ) at an angle of influence (AOI)=35 degrees (top panel) and an AOI=77 degrees (bottom panel) for an absorber, according to embodiments of the invention.

In FIGS. 2 through 5, grey-scale is used to assist with showing absorptance magnitude. Absorptance is shown in two-dimensional figures for ease of viewing. FIG. 2 is a graphical comparison of absorptance as a function of dissipation, $\Im(\epsilon_z)$ and the ratio of the primary layer thickness to the absorber wavelength (d/$\lambda$) at an angle of influence (AOI) =35 degrees (top panel) and an AOI=77 degrees (bottom panel) for an absorber, according to embodiments of the invention. The graphical comparison is depicted as reference character 200.

FIG. 2 depicts, in the right panels (202A and 202B), absorptance as a function of $\Im(\epsilon_z)$ and d/$\lambda$ at the AOI=35° (top 204A) and AOI=77° (bottom 204B) for the ENZ-PEC bilayer. z,900 ($\epsilon_z$)=$10^{-4}$. The magnitude of the absorptance is depicted in right panels 202A and 202B. White (less grey/dark) regions 206A and 206B indicate an interesting behavior that the lower loss (a smaller $\Im(\epsilon_z)$) uses a thinner (a smaller d) material to achieve PA. In the left panels 208A and 208B, PA trajectory, d/$\lambda$ vs. $\Im(\epsilon_z)$, which is extracted numerically (solid lines 210A and 210B) from the absorptance corresponding to the right panels 202A/B and is calculated analytically (circles 212A and 212B) from Eq. (1). Similar phenomenon is also observed for the Ag-substrate (not shown in FIG. 2).

Interestingly, for a fixed AOI, a smaller dissipation $\Im(\epsilon_z)$ has a smaller d/λ ratio to achieve PA, as shown in the right panels 202A/B of FIG. 2., where the absorptance is plotted in the two dimensional (2D) domain of d/λ and $\Im(\epsilon_z)$ at the two fixed AOI for the PEC substrate. FIG. 2 indicates that there is a linear relationship between the ratio d/λ and dissipation $\Im(\epsilon_z)$ for PA to occur. To analyze this PA anomaly, the reflection coefficient of the ENZ-PEC bilayer is examined. When $\epsilon_z \to 0$ and d<<λ, and z,900 $(\epsilon_z)<<\Im(\epsilon_z)$, the following relationship, referred to as Equation 1 (or Eq. 1), is obtained:

$$\frac{d}{\lambda} \approx \frac{\Im(\epsilon_z)}{2\pi \sin\theta_p \tan\theta_p}. \quad (1)$$

Equation 1 shows a linear relationship between the d/λ and $\Im(\epsilon_z)$ and explains the behavior in FIG. 2. For any AOI, when $\Im(\epsilon_z) \to 0$, the ratio d/λ goes to zero as well to ensure PA. Equation (1) provides guidance for reducing the thickness of absorbers. To verify Equation (1), the left panels 208A/B of FIG. 2 show the PA trajectory, d/λ vs. $\Im(\epsilon_z)$, which is obtained from both numerical (solid lines 210A/B) and analytical (circles 212A/B) methods, showing consistency. The PA angle ($\theta_p$) can be derived from Eq. (1), such that the following relationship, referred to as Equation 2 (or Eq. 2), is obtained:

$$\cos\theta_p = -\sigma + \sqrt{1+\sigma^2}, \quad \sigma \equiv \frac{\Im(\epsilon_z)}{2k_0 d}. \quad (2)$$

Equation (2) provides a full range (from 0°~90°) of AOI where PA can occur with the $\theta_p \to 0°$ when $\sigma \to 0$ and $\theta_p \to 90°$ when $\sigma \to \infty$.

Figure 3:
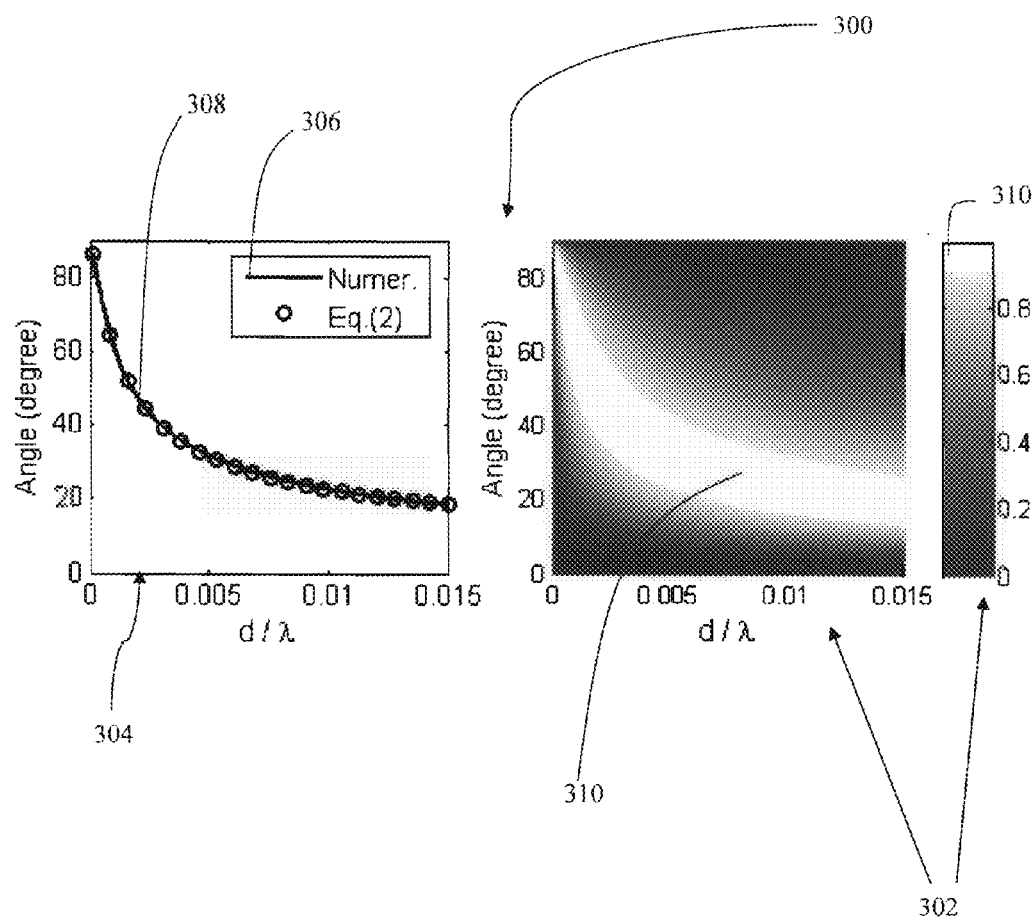
FIG. 3 is a graphical comparison of absorptance as a function of AOI and d/λ for a silver (right panel) substrate along with the corresponding perfect absorption (PA) angle as a function of d/λ, according to embodiments of the invention.

FIG. 3 is a graphical comparison of absorptance as a function of AOI and d/λ for a silver (right panel) substrate along with the corresponding perfect absorption (PA) angle as a function of d/λ, according to embodiments of the invention. The graphical comparison is depicted as reference character 300. FIG. 3 depicts in the right panel (302) absorptance vs. AOI and d/λ for a silver (Ag) substrate with $\epsilon_z$=0.001 +0.01i. The Ag layer thickness, $d_2$, =200 nm. The permittivity of Ag is taken at λ=10 μm. In the left panel 304, PA angle vs. d/λ is plotted. The PA angles were numerically extracted (solid line 306) from the 2D absorptance corresponding to the right panel 302. For comparison, the circles 308 represent the PA angles computed from Eq. (2) for the Ag substrate. The white (less grey/dark) region 310 indicates greater absorptance magnitude.

Figure 4:
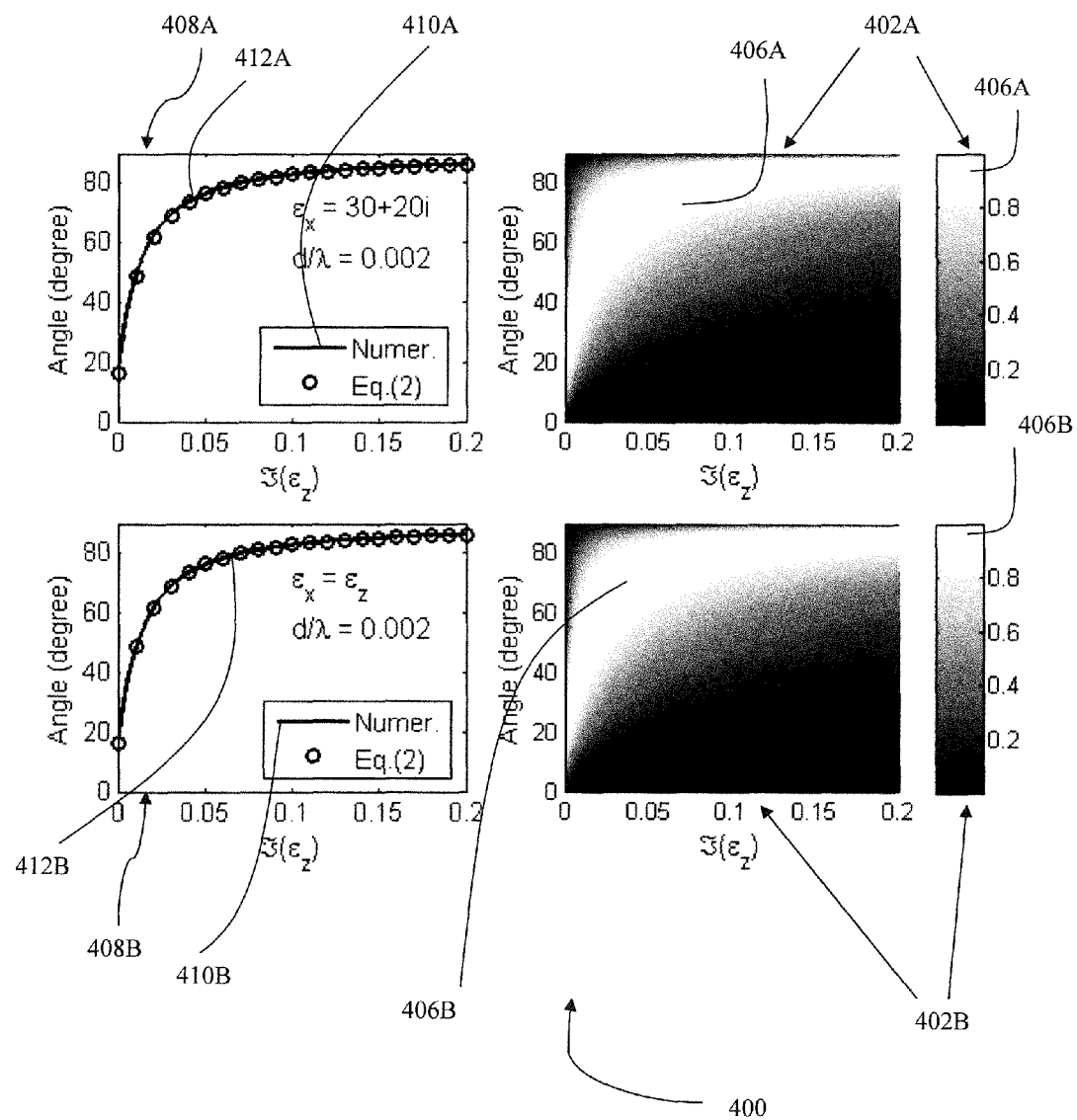
FIG. 4 is a graphical comparison of absorptance of the ENZ-PEC absorber as a function of AOI and $\Im(\epsilon_z)$ (right panels) for different $\epsilon_x$ values, as well as the corresponding PA angle vs $\Im(\epsilon_z)$ (left panels), according to embodiments of the invention.

FIG. 4 is a graphical comparison of absorptance of the ENZ-PEC absorber as a function of AOI and $\Im(\epsilon_z)$ (right panels) for different $\epsilon_x$ values, as well as the corresponding PA angle vs $\Im(\epsilon_z)$ (left panels), according to embodiments of the invention. The graphical comparison is depicted as reference character 400. FIG. 4 in the right panels (402A and 402B), absorptance vs. AOI and $\Im(\epsilon_z)$ for ENZ-PEC bilayer when $\epsilon_x$=30+20i (top panels 402A and 408A) and $\epsilon_x=\epsilon_z$ (bottom panels 402B and 408B) when z,900 $(\epsilon_z)$=0.001 and d/λ=0.002. In the left panels (408A and 408B), perfect absorption angle vs. $\Im(\epsilon_z)$ is numerically extracted (solid lines 410A and 410B) from the absorptance corresponding to the right panels (402A/B), and is analytically calculated for a silver (Ag) substrate (circles 412A and 412B) from Eq. (2). The permittivity of Ag was taken at the λ=10 μm. The white (less grey/dark) regions 406A and 406B indicate greater absorptance magnitude. FIG. 4 indicates that $\epsilon_x$ does not have much influence on the absorption when d/λ<<1.

FIGS. 2 through 4 confirm the anomalous perfect absorption in ENZ/metal bilayer structures. In particular, Eqs. (1) and (2) provide a concise analytical expression to describe this exotic behavior. This phenomenon of it being possible for both dissipation and thickness approaching zero and perfect absorption still occurring can be understood from coherent perfect absorption (or stimulated absorption). Coherent perfect absorption (CPA) is a time reversed process of lasing at threshold and a perfect mode conversion mechanism.

Figure 5:
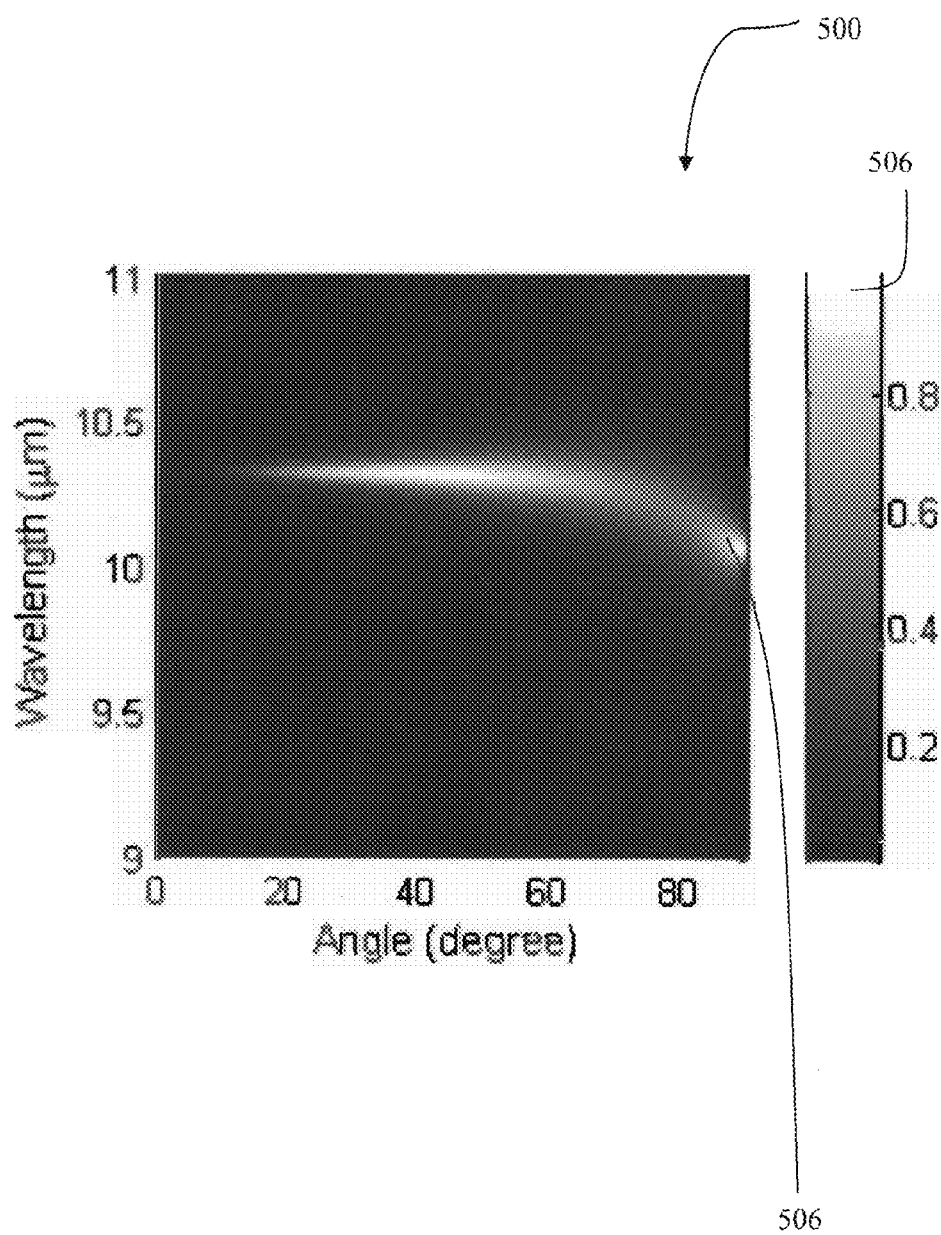
FIG. 5 is a graphical comparison of absorptance of the ENZ absorption band in a silicon carbide/copper bilayer as a function of AOI and wavelength, according to embodiments of the invention.

FIG. 5 is a graphical comparison of absorptance of the ENZ absorption band in a silicon carbide/copper bilayer as a function of AOI and wavelength, according to embodiments of the invention. The graphical comparison is depicted as reference character 500. Experimental results show that absorptance vs. wavelength and angle when the absorber 100 (FIG. 1) is made from silicon carbide (SiC) and copper (Cu). In this scenario, the primary layer 112 (FIG. 1) is SiC and the secondary layer 114 (FIG. 1) is Cu. The modeled thickness of SiC is 320 nm. The modeled thickness of Cu is 200 nm. The white (less grey/dark) region 506 indicates greater absorptance magnitude. Absorption frequency is selected via tuning the ENZ wavelength.

Experimental results of embodiments of the invention demonstrate that perfect absorption in the ENZ-metal structures occur where the ENZ material has near-zero loss and near-zero thickness. The linear relationship between loss and thickness at perfect absorption promotes the concept of using dissipation to control thickness to achieve ultrathin absorbers. This unconventional phenomenon can be understood in terms of coherent perfect absorption, thus providing a different perspective and a physical insight on high-impedance meta-absorbers and may impact future absorber constructions, as well as lasing materials. Based on the significant modeling and experimental results, embodiments of the invention can be beneficial for cloaking, EM shielding, photocells, and sensors.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. An absorber having an absorption wavelength, λ, comprising:
   at least one primary layer having a thickness, d, and a relative permittivity of epsilon-near-zero, $\epsilon$; and at least one reflective secondary layer associated with said at least one primary layer.

2. The absorber according to claim 1, further comprising:
wherein the thickness of said at least one primary layer, d, is less than one-tenth of an absorber absorption wavelength, $\lambda$;
wherein a ratio of d/$\lambda \leq 0.1$;
wherein, when a real component of relative permittivity in a z-direction of said at least one primary layer, z,900 ($\epsilon_z$), approaches zero, z,900 ($\epsilon_z$)→0; and
wherein, when the real component of relative permittivity in the z-direction of said at least one primary layer, z,900 ($\epsilon_z$), is much less than an imaginary component of relative permittivity in the z-direction, $\Im(\epsilon_z)$, z,900 ($\epsilon_z$)<<$\Im(\epsilon_z)$, d/$\lambda$ and $\Im(\epsilon_z)$ are linearly related by $$\frac{d}{\lambda} \approx \frac{\Im(\epsilon_z)}{2\pi \sin\theta_p \tan\theta_p},$$

where $\theta_p$ is an absorption angle of the absorber.

3. The absorber according to claim 1, wherein said at least one primary layer is a natural dielectric material.

4. The absorber according to claim 1, wherein said at least one primary layer is an engineered material.

5. The absorber according to claim 1, wherein said at least one secondary layer is at least one reflective substrate.

6. The absorber according to claim 1, wherein said association between said at least one primary layer and said at least one reflective secondary layer is by bonding.

7. The absorber according to claim 1, wherein said at least one reflective secondary layer is selected from the group consisting of natural reflective materials and engineered reflective materials.

8. A bi-layer absorber having an absorption wavelength, $\lambda$, comprising:
at least one natural dielectric layer having a thickness, d, and a relative permittivity of epsilon-near-zero, $\epsilon$; and
at least one reflective layer bonded to said at least one natural dielectric layer.

9. The bi-layer absorber according to claim 8, further comprising:
wherein the thickness of said at least one natural dielectric layer, d, is less than one-tenth of a bi-layer absorber absorption wavelength, $\lambda$;
wherein a ratio of d/$\lambda \leq 0.1$;
wherein, when a real component of relative permittivity in a z-direction of said at least one natural dielectric layer, z,900 ($\epsilon_z$), approaches zero, z,900 ($\epsilon_z$)→0; and
wherein, when the real component of relative permittivity in the z-direction of said at least one natural dielectric layer, z,900 ($\epsilon_z$), is much less than an imaginary component of relative permittivity in the z-direction, $\Im(\epsilon_z)$, z,900 ($\epsilon_z$)<<$\Im(\epsilon_z)$, d/$\lambda$ and $\Im(\epsilon_z)$ are linearly related by $$\frac{d}{\lambda} \approx \frac{\Im(\epsilon_z)}{2\pi \sin\theta_p \tan\theta_p},$$

where $\theta_p$ is an absorption angle of the bi-layer absorber.

10. The bi-layer absorber according to claim 8, wherein said at least one natural dielectric layer is silicon carbide.

11. The bi-layer absorber according to claim 8, wherein said at least one reflective layer is copper.

12. A bi-layer absorber having an absorption wavelength, $\lambda$, comprising:
at least one engineered-material layer having a thickness, d, and a relative permittivity of epsilon-near-zero, $\epsilon$; and
at least one reflective layer bonded to said at least one engineered-material layer.

13. The bi-layer absorber according to claim 12, wherein said at least one engineered-material layer is a composite.

14. The bi-layer absorber according to claim 12, wherein said at least one reflective layer is selected from the group consisting of natural reflective materials and engineered reflective materials.

15. The bi-layer absorber according to claim 12, further comprising:
wherein the thickness of said at least one engineered-material layer, d, is less than one-tenth of a bi-layer absorber absorption wavelength, $\lambda$;
wherein a ratio of d/$\lambda \leq 0.1$;
wherein, when a real component of relative permittivity in a z-direction of said at least one engineered-material layer, z,900 ($\epsilon_z$), approaches zero, z,900 ($\epsilon_z$)→0; and
wherein when the real component of relative permittivity in the z-direction of said at least one engineered-material layer, z,900 ($\epsilon_z$) is much less than an imaginary component of relative permittivity in the z-direction, $\Im(\epsilon_z)$, z,900 ($\epsilon_z$) <<$\Im(\epsilon_z)$, d/$\lambda$ and $\Im(\epsilon_z)$, are linearly related by $$\frac{d}{\lambda} \approx \frac{\Im(\epsilon_z)}{2\pi \sin\theta_p \tan\theta_p},$$

where $\theta_p$ is an absorption angle of the bi-layer absorber.

* * * * *

UNITED STATES PATENT AND TRADEMARK OFFICE
CERTIFICATE OF CORRECTION

| | |
|---|---|
| PATENT NO. | : 8,995,055 B1 |
| APPLICATION NO. | : 13/585111 |
| DATED | : March 31, 2015 |
| INVENTOR(S) | : Simin Feng |

It is certified that error appears in the above-identified patent and that said Letters Patent is hereby corrected as shown below:

In the Specification,

In column 3, lines 28, 30, 32, 34, and 35, each occurrence of "z,900" should be deleted and replaced with --R--.

In column 4, lines 14, 39, and 59, each occurrence of "z,900" should be deleted and replaced with --R--.

In column 5, lines 11, and 61, each occurrence of "z,900" should be deleted and replaced with --R--.

In the Claims,

In column 7, CLAIM 2, lines 7, 8, 10, and 12, each occurrence of "z,900" should be deleted and replaced with --R--.

In columns 7 and 8, CLAIM 9, lines 9, 12, and 14, each occurrence of "z,900" should be deleted and replaced with --R--.

In column 8, CLAIM 15, lines 9, 12, and 14, each occurrence of "z,900" should be deleted and replaced with --R--.

Signed and Sealed this
Fourteenth Day of July, 2015

Michelle K. Lee
*Director of the United States Patent and Trademark Office*